United States Patent [19]

Burrows et al.

[11] 4,276,311
[45] Jun. 30, 1981

[54] FOOD PRODUCT AND PROCESS

[75] Inventors: Ian E. Burrows, Gaddesby; Peter A. Cheney, Leicester, both of England

[73] Assignee: Mars Limited, London, England

[21] Appl. No.: 60,172

[22] Filed: Jul. 24, 1979

Related U.S. Application Data

[63] Continuation-in-part of Ser. No. 696,896, Jun. 17, 1976, abandoned.

[51] Int. Cl.³ ............................................. A23B 4/12
[52] U.S. Cl. .................................... 426/56; 426/59; 426/335; 426/532; 426/577; 426/805; 426/92
[58] Field of Search .................. 426/55, 56, 335, 532, 426/805, 59, 575, 577, 92

[56] References Cited

U.S. PATENT DOCUMENTS

| | | | |
|---|---|---|---|
| 3,899,594 | 8/1975 | Nickerson | 426/59 X |
| 3,982,003 | 9/1976 | Mitchell | 426/805 X |
| 4,041,181 | 8/1977 | Burrows | 426/55 |

*Primary Examiner*—R. B. Penland
*Attorney, Agent, or Firm*—Davis, Hoxie, Faithfull & Hapgood

[57] ABSTRACT

A shelf stable food product, which can be used for domestic animals comprises solid protein pieces in an aqueous gel and contains 6 to 20% protein, 3 to 12% fat and 65 to 95% moisture and is stabilized by antimycotic and a pH of 4.5 or below achieved with acid-producing micro-organisms. The product is prepared by dissolving a gelling agent in the aqueous phase of the product components at a pH value above 4.5, and after adding the other ingredients a gel is formed, and the pH is reduced by fermentation to a value below 4.5. Gelling agents may be ionic polysaccharides, including alginates, pectates and carrageenan, or thermoreversible protein systems such as gelatine.

8 Claims, No Drawings

FOOD PRODUCT AND PROCESS

CROSS REFERENCE TO RELATED APPLICATION

This application is a continuation-in-part of our application Ser. No. 696 896 filed June 17, 1976 now abandoned.

The present invention relates to gelled or thickened food products and in particular to microbiologically stable products containing edible proteinaceous solids in aqueous medium.

Compositions of high moisture content comprising particles or pieces of meat or other edible protein solids in a gelled aqueous medium are well known, in both human and animal food contexts, for example as brawns or meat-in-jelly products. Such products, however are not ordinarily shelf-stable and can only be stored by special measures, usually by sterilization within sealed containers, as in canning.

The fermentation of proteinaceous substances by acid-producing, usually lactic acid producing, microorganisms is also known. For example, in U.S. Pat. No. 4,041,181 the present inventors and S. A. Ariss disclose the preparation of preserved intermediate moisture compositions of 30 to 40% moisture content, in which starting materials of meat or fish are first fermented and autolysed until an acid semi-liquid slurry is obtained, after which a heat-activated binder such as starch or a coagulable protein (e.g. gluten) together with humectant and other ingredients are mixed in, and the mixture heated and shaped, for example by extrusion and cooking, to form chewy, resilient, meat-like chunks.

The present invention, in contrast, is concerned with the provision of a high moisture content, jellied product, which cannot be effectively preserved by the use of solutes or humectants owing to the unacceptably high concentration of such substances that would be required. Furthermore, the products of the invention are not chewy, resilient meat-like masses, but consist rather of pieces of meat or other protein food dispersed or suspended in a jelly medium of high moisture content, for which purpose a cold-setting or thermoreversible gelling agent is required.

We have further found that the process of U.S. Pat. No. 4,041,181 is not suitable for making the jellied products now desired because the heat-activation and shaping process requires an irreversible setting reaction and cannot be used to form high moisture meat-in-jelly structures with thermoreversible gelling agents. Furthermore, since fermentation in the prior process is applied to the starting materials, the mix is already acid when the binder is added and heated. This raises no problem with the binders employed in the patent, but we have found that many thermoreversible gelling agents will not give satisfactory gels under these conditions.

There is a variety of reasons for this. For example, some gelling agents will not dissolve in water if the pH value is too low. Typical of such gelling agents are 'ionic' gelling agents containing carboxyl groups, such as alginates and pectates. Others are chemically sensitive to acid conditions and are degraded by heat under such conditions Typical of these agents are polysaccharide agents containing sulphate groups, such as carrageenan and agar.

The present invention now provides a method whereby these and other gelling agents can be used to form jellied meat products, which are shelf stable by virtue of their low pH, without the disadvantage of heating the gelling agent in a relatively strongly acid environment for the purposes of solution.

In accordance with this method the gelling agent is dissolved in water or the aqueous phase of the product mix while the latter is in a neutral or usably acid condition, say above pH 4.5, and only after this, and after any necessary cooling to avoid harming the organisms, is a culture or inoculum of the acid-producing organism added and incubation commenced. The meat or other protein material, which will usually have been pasteurized, and any other necessary ingredients such as antimycotic or fermentable carbohydrate, may be added at any suitable stage but should be mixed in before the gel is formed because once a gel structure has developed the other ingredients and the culture cannot be satisfactorily dispersed throughout the product.

Not only is the method of the said U.S. Patent entirely unsuitable for making the desired products of this invention, but the process of the invention is equally unsuitable for making the products of the said Patent. Apart from the characteristic difference in moisture content, the heating stage in the present process would, with sufficient of the heat-activated binders of the said Patent to form a set product, result in a set structure upon heating, so that it would be impossible subsequently to disperse the starter culture or inoculum of the organisms throughout the product, or any other ingredient not already present. If, on the contrary, there was insufficient binder to set on heating, there would be no set structure in the final product.

According to the present invention the resulting food product comprises solid foodstuff, including particles or pieces of proteinaceous tissue in an aqueous gel, having a moisture content of 65–95%, a protein content of 6–20% and a fat content of 3–12%, and being microbiologically stable by virtue of an acidic pH value achieved or maintained by acid-producing micro-organisms.

The product preferably has a pH in the range 3.7–4.3 and should be maintained under antimycotic conditions usually by the inclusion of an antimycotic, for example sorbic acid compounds such as potassium sorbate, benzoates such as p-hydroxy benzoate or a mixture of the two.

In accordance with a further important aspect of this invention, the gel structure is formed in the mix containing the solid foodstuff including proteinaceous tissue, fermentable substance, antimycotic, and moisture at a pH value above 4.5 and the composition is thereafter subjected to acid-producing fermentation until its pH value is below 4.5, especially in the range 3.7–4.3.

This technique of forming an aqueous mix containing edible protein tissue at a pH above 4.5 and subsequently achieving micro-biological stability by fermentation with acid-producing organisms is not, however, confined to products having a rigid gel matrix. It can also be employed more generally to obtain products of the type, for example, of meat in a thickened gravy. In these cases, a gelling agent may be present to provide a thickened gravy. This procedure has the advantage that it can be carried out, without adaptation, in the same plant as is employed in the production of gel products as described above.

In most cases where a rigid gel is required, the freshly prepared and still liquid mix and the desired acid-producing microorganisms are filled into packaging container and subsequently incubated in the containers. When a gravy product is being made, however, or when a low temperature thermoreversible gel system is employed, the mix can be fermented in bulk and held at the incubation temperature until it is packaged.

As mentioned above, the invention is especially concerned with products having an aqueous phase in the form of a high moisture content gel. Gelling agents for this purpose include a wide range of chemical types, for example proteins and polysaccharides.

The invention is particularly valuable when 'ionic' gelling agents are used, which include acidic groups and form ionotropic gel structures by reaction with calcium or ther di- or polyvalent metal ions. Many such agents cannot be dissolved or formed into satisfactory gel structures at pH values below 4.5 and the invention affords a technique by which products of low pH value can be formed with stable gels provided by such agents.

Examples of ionic gelling agents include acidic polysaccharide gelling agents such as pectic substances, alginates and polygalacturonates, and also certain gelling agents of microbial origin, such as microbial alginates.

Thermoreversible polysaccharide or protein gelling agents such as carrageenan or gelatin can also be used, but preferably not solely proteins of the casein group.

The mix may contain a source of calcium or other acceptable divalent metal ions, either for nutritional reasons or where ionic gelling agents are employed, when such ions are needed to assist in the formation of a gel structure. The necessity for an exogenous source of calcium ions will depend on the gelling agent or agents used, the nature of the ingredients and nutritional requirements.

Pectic substances employed in this invention are preferably pectates or pectins having a degree of esterification (D.E.) below 20%. Crude natural sources of pectins can be employed, especially when their D.E. has been reduced, chemically or enzymatically, to below 20%.

Citrus peel is a readily available source of pectins and in this specification the expression 'treated citrus peel' refers to citrus peel that has been comminuted and its D.E. reduced below 20% by treatment with alkali or enzymes or by promoting the action of enzymes naturally contained within th peel. Where a rigid gel is desired it is preferable to include a source of calcium ions and sequestrant such as sodium tripolyphosphate, tetrasodium pyrophosphate or citric acid.

As proteinaceous tissue in the product of this invention may be used, and by this term is thus meant to be included, any edible, solid, ordinarily insoluble protein tissue, notably traditional meats, including fish or poultry, offals, other animal protein sources such as dried greaves, vegetable protein materials and structured or textured proteins. Meaty materials may be pasteurized or sterilized, as may be required by current food regulations or as demanded in achieving desirable microbiological safety standards.

Apart from the proteinaceous material, or other solid foodstuff, fat, moisture and gelling agent, the product will usually contain residual fermentable carbohydrate, and may also contain vitamins or other nutritional supplements, colouring agents, antioxidants, antimycotics, preservatives or other additives.

In putting the invention into practice, a solution may be prepared with desired amount of water and containing the gelling agent, any necessary calcium or other metal ion, sequestrant and fermentable substances additional to any already present in the other ingredients such as fermentable carbohydrate, e.g. glucose or lactose, and optionally an organic nitrogen source, and preferably also an antimycotic. The solution may be heated to dissolve the soluble substances, but should then be cooled before a culture of an acid producing micro-organism is added. Preferred micro-organisms are homo-fermentative lactic acid-producing bacteria such as *Lactobacillus casei, L. bulgaricus, Streptococcus lactis* and *S. thermophilus,* either singly or in any combination. It has been found most convenient to add the micro-organisms in the form of an inoculum, in a quantity depending on the time necessary for fermentation to the final pH and on the strain of micro-organisms used. The quantity will most usually be in the range of 1–10% by weight of the total composition as packed. Other forms of culture, for example freeze-dried starter cultures, can also be used.

The solution, which will ordinarly have a pH in the region of 6, is then mixed with the solid foodstuffs, which may be a previously prepared and pasteurized mix of meats or meat by-products, but may also include or consist of vegetable protein in a suitably prepared from. The latter need not be pasteurized in the manner necessary in the case of meats. The protein materials may be finely divided into particles, for example by grinding, but more usually will be in the form of minced or chopped pieces which, at least in the case of pasteurized meat chunks, are preferably not larger than 3.0 $cm^3$. This limit is less significant in the case of sterilized materials or vegetable protein materials such as textured vegetable protein, but the pieces should not be larger than is convenient for filling the containers to be employed or for acceptance by the consumer.

When the solution of gelling agent and the inoculum have been mixed with the solid proteinaceous materials, the composition is subjected to incubation conditions. The gelling agent will form a gel structure throughout the product under the relatively neutral pH conditions prevailing in the early of incubation, but as incubation proceeds the micro-organisms will bring about a reduction in pH value until stability is reached at a pH value of 4.5 or less without loss of the gel structure. The product may be packed into sealable containers before incubation or, when a suitable thermoreversible gel is produced, it may be incubated in bulk at a temperature above the gel point and packed before cooling. Gravy type products can also be fermented in bulk. The resulting product will usually contain, and indeed preferably contains, viable acid-producing organisms, and can be stored for long periods at ordinary temperatures.

In the preferred embodiments of the present process, a sequestering agent, antimycotic, colouring agent and glucose may be added to cold water and dissolved while being heated to, for example, 70°–90° C. whereupon the gelling agent is added with vigorous agitation. The mixture is then cooled to 35°–45° C. before the acid-producing fermentation inoculum is added.

Alternatively, the sequestering agent may be dissolved in water and glucose and, if desired, an organic nitrogen source added and dissolved. The temperature of the liquid is raised, for example to 70°–90° C. and the gelling agents are added with vigorous agitation. The mixture is then partially cooled before the addition of potassium sorbate, colouring agents as desired, and an acidic fermentation inoculum of lactic acid-producing bacteria, e.g. *L. casei* or *S. lactis.*

The gravy mix prepared by either of these alternative procedures is added to a previously prepared and pasteurized or sterilized meat mix. The resultant mixture may be packed in transparent plastic re-sealable containers before being incubated, for example at 30° C. for 12-24 hours.

A further alternative is for the inoculum to be added to the mixed meats after they have been mixed with the gravy. When proceeding in this way, one may be able to make use of the temperature difference between the meats and the gravy to effect some of the necessary cooling.

The products prepared in this way may be found to possess a good meat-in-jelly appearance with a fresh meaty aroma. The food is highly acceptable to pet animals.

The following examples illustrate the practice of this invention. All percentages are by weight unless the context otherwise requires.

EXAMPLE 1

This example illustrates the preparation of a stable low pH, high $A_w$ chunky meat in jelly food product.

Tripe, lung and muscle meats were comminuted by passage through a mincer fitted with a 1.0 cm plate and four-bladed cutter. The meats were mixed in the ratio 44:40:16 of tripe:lung:muscle meats and the mixture was boiled for 20 min at 100° C.

A gravy was prepared to the following formulation:

|  | % of Product |
| --- | --- |
|  | 92.54 |
| Sodium tripolyphosphate | 0.5 |
| Glucose | 2.8 |
| Potassium sorbate | 0.4 |
| Dyestuff | As desired |
| Guar gum | 0.93 |
| Treated citrus peel | 0.93 |
| Inoculum | 1.90 |
| Water | Balance of gravy |

The sodium tripolyphosphate, glucose, potassium sorbate and dyestuff were added to the water, and the mixture was heated to 70° C. with agitation. The guar gum and treated peel were added with vigorous agitation and the temperature was increased to 80° C. The resultant mixture was cooled to 35° C. before the addition of the inoculum which was a 20LH culture of L. casei.

The gravy was added to the meat mix in a meat:gravy ratio of 70:30 and mixed well before being packaged in transparent plastic pots with resealable lids. The pH of the mixture was 6.4. The pots were placed in an incubator at 30° C. for 24 hours. During the initial part of this period, i.e. 1-2 hours, the ionic gel structure formed. Only subsequently did the viable inoculum reduce the pH of the system to 3.8-4.2 by conversion of the added sugars to lactic acid. The gel system was stabilized against syneresis by the guar gum.

The inoculum was prepared by growing a pure culture of Lacto-bacillus casei in MRS broth for a period of 12-20 hours.

The product possessed a very attractive appearance with discrete chunks of meat in the jelly matrix. It appeared very similar to traditional canned jelly meat pet food products.

EXAMPLE 2

This example demonstrates the production of a microbiologically stable brawn-like product.

A meat mix was prepared as in Example 1 except that (a) the meats were put through a 4.0 mm plate, (b) equal ratios of lung and muscle meats were used, and (c) the meats were boiled in the presence of 0.4% potassium sorbate.

A gravy was prepared to the following formulation:

|  | % of Product |
| --- | --- |
|  | 90.64 |
| Sodium tripolyphosphate | 0.50 |
| Glucose | 2.80 |
| Treated citrus peel | 0.93 |
| Guar gum | 0.93 |
| Potassium sorbate | 0.4 |
| Dyestuff | As desired |
| Inoculum | 3.80 |
| Water | Balance of gravy |

The gravy was prepared as described in Example 1. The inoculum was a culture of L. bulgaricus prepared as described for L. casei in Example 1.

The meat and gravy mixes were combined in the ratio 52:48 and the resultant mix packaged in plastic tubs of the type conventionally used to hold margarine. The tubs were incubated for 24 hours at 30° C.

The product exhibited a pH of 4.0 and a brawn-like appearance. It was stable at ambient temperature against any microbial attack.

The container can serve either as a re-sealable supply vessel of the food or as a disposable food dish.

EXAMPLE 3

This Example demonstrates the use of another gel system normally unstable during formation at acid pH values.

A solution of 20% spray dried skimmed milk solids in water was prepared. To 3000 mil. of this solution at 80° C. were added 6.0 g of carrageenan, 6.0 g carob gum, 3.0 g of potassium sorbate, 27.0 g of potassium chloride and colouring agents. These components were dissolved and then 600 g of cooked meat chunks were added. The whole mixture was cooled at 68° C. before the addition of 5.0% of a viable suspension of L. casei in MRS broth. The inoculum was mixed in and the mixture poured into suitable transparent containers. The containers were then rapidly cooled to about 40° C. before being put into an incubator at 30° C. for 12-15 hours.

The product had the appearance of meat chunks in a cloudy opaque gel system. The pH of the product was 4.0 and it possessed a meaty and milky aroma. It was highly acceptable to pet animals especially cats.

EXAMPLE 4

This example shows the use of an alternative ionic gel system.

A low viscosity alginate (Alginate Industries Ltd., grade LH7) was used as in Example 1 in place of the treated peel at 50% of the level of treated peel, i.e. 0.5% and necessary calcium was supplied by replacing the sodium tripolyphosphate with 1% dicalcium phosphate dihydrate. The product has the same appearance as that described in Example 1.

EXAMPLE 5

This Example demonstrates the use of a thermal setting gelling agent in the process of this invention. Calcium and phosphorus are included at desirable additional levels. The calcium does not here play any part in the gel system.

Meats were prepared and cooked as described in Example 2.

A gravy was prepared to the following formulation:

|  | % |
| --- | --- |
| Calcium Phosphate ($Ca_3(PO_4)_2$) | 0.8 |
| Gelatine | 7.5 |
| Glucose | 6.0 |
| Potassium sorbate | 0.4 |
| Erythrosine solution | 0.5 |
| Caramel | 0.75 |
| Inoculum (L Casei) | 2.0 (of total composition as packed) |
| Water | to 100% |

The gravy was prepared by dissolving all the ingredients in water, heating gently to dissolve the gelatine, and cooling the mixture to 40°–45° C. before adding the inoculum. The gravy was added to the meats in a 70:30 meat/gravy ratio, well mixed and the composition was packaged in resealable containers prior to incubation at 30° C. for 24 hours.

The product had a pH of 4.3 and the following analysis:

|  | % |
| --- | --- |
| Moisture | 84.0 |
| Protein | 11.5 |
| Fat | 2.5 |
| Ash | 0.9 |
| % acidity | 1.77 |

The gelatine gel was tough and rubbery and the product exhibited a very pleasing appearance

EXAMPLE 6

By using an inoculum e.g. of L. bulgaricus with a higher growth temperature, i.e. 42° C., the above Example 5 can be adapted to fermentation in bulk prior to packaging, the gel being allowed to set on cooling in the individual containers.

EXAMPLE 7

This example illustrates the use of dry ingredients in the formulation.

A gravy is prepared according to the following formulation:

|  | % of total product |
| --- | --- |
| Sodium tripolyphosphate | 0.25 |
| Treated peel | 0.5 |
| Guar gum | 0.5 |
| Caramel | 1.5 |
| Erythrosine solution | 0.5 |
| Potassium sorbate | 0.4 |
| Glucose (e.g. Trudex) | 3.0 |
| Organic nitrogen source (e.g. Corn Steep Liquor) | 0.5 |
| Water* | to 75.0 |

*only half of the water is used in gravy preparation.

After preparation of the gravy as described previously the remaining cold water is added, followed by the required amount of dried greaves i.e. 25% of the total product. The additional of cold ingredients at this stage lowers the temperature of the mixture to 30°–40° C. and hence avoids the necessity.

An additional cooling step prior to additional of the inoculum (3%). All ingredients are then throughly mixed prior to packaging and incubation at 30° C. for 24 hours.

After 24 hours the pH of the mixture had fallen to pH 4.2.

EXAMPLE 8

The following is an example of a meat and cereal product.

Conditioned sheep lung which had been minced through a 1.0 cm plate was mixed with:
Maize Grits 15% (based on the weight of lung)
Wheat Feed 5% (based on the weight of lung)

The meat and cereals were cooked at 121° C. for 50 minutes to produce a firm 'loaf' structure.

A gravy was prepared according to the formulation:

|  | % of Product |
| --- | --- |
| Treated citrus peel | 1.0 |
| Guar gum | 1.0 |
| Glucose | 7.0 |
| Potassium sorbate | 0.4 |
| Sodium tripolyphosphate | 0.5 |
| Caramel | 1.5 |
| Erythrosine solution | 0.5 |
| Water | Balance. |

The meat and cereals were formulated with gravy in a 60:40 ratio and the mixture cooled to 35° C. before inoculation with L. bulgaricus suspension (3.0% of total pack). After packaging and incubation, the product had a pH of 3.9 and a firm 'loaf' type structure with a cereal aroma.

EXAMPLE 9

To investigate the effect of different processing sequences on formulations employing different gelling agents, a series of experiments was conducted.

The basic formulations used were as follows:

|  | (1) % | (2) % | (3) % |
| --- | --- | --- | --- |
| Meat Mix | 70.0 | 70.0 | 70.0 |
| Sodium Tripolyphosphate | 0.5 | 0.5 | 0.5 |
| Glucose | 2.8 | 2.8 | 2.8 |
| Potassium Sorbate | 0.4 | 0.4 | 0.4 |
| Inoculum (L. helveticus) | 1.9 | 1.9 | 1.9 |
| Treated Citrus Peel | 2.0 | — | — |
| Carrageenan | — | 1.0 | — |
| Potassium Chloride | — | 0.5 | — |
| Gelatin | — | — | 5.0 |
| Guar Gum T6 | — | 1.0 | — |
| Water | 22.4 | 21.9 | 19.4 |
|  | 100.0 | 100.0 | 100.0 |

The meat mix was prepared as described in Example 1. Similarly, each product was prepared as described in Example 1 with the exception of the carrageenan product (formulation (2)). This product was prepared by adding the hot gravy mix, without inoculum to the meat mix and heating the mixture to a temperature in excess of the carrageenan melting point (about 80° C.). The mixture was stirred and cooled simultaneously, and the inoculum was added when the temperature of the mixture had dropped to 60° C. The mixture was then cooled rapidly in ice without further stirring.

All products were incubated at 37° C. for about 48 hours, and the final pH measured.

By way of comparison, the three formulations (1), (2) and (3) were processed in accordance with the teachings of U.S. Pat. No. 4,041,181.

The raw meats, in the same quantity and ratio as in the above formulation (1) were taken, but minced and prepared as described in example 1 of the U.S. Patent by passing them through a 5 mm Hobart plate. To each 700 g quantity of this mixture, 4 g of potassium sorbate, 28 g of glucose, 19 g of inoculum (*L. helveticus*), and 194 g of water were added.

The mixture was stirred and incubated at 37° C. overnight until the acidity had dropped to pH 4.

The three different types of gelling agents and associated ingredients were added to aliquots of the fermented meat such that the percentage of each ingredient in the final product was the same as that used in the preparation of the three formulations (1), (2) and (3) above.

Extrusion of each mixture was attempted as described in example 1 of U.S. Pat. No. 4,041,181. In the instances where extrusion was not possible due to the liquid nature of the mixture, a thin layer of each mixture was cooked in a convection oven at 275° F. for about 9 minutes until the material reached a temperature of about 80° C.

The three products prepared by each of the two techniques were compared in terms of textural quality. The results are tabulated below:

| Example and Type | Process of Present Example 1 | Process of U.S. 4041181 Preparation Process |
| --- | --- | --- |
| 1. Treated Citrus Peel (Ionic gelling polysaccharide) | Firm, cohesive, solid product. Granular appearance on cutting, shiny outer surface. pH 3.7 | Weak, mushy, sticky product, no indication of gel. Granular mush. Not extrudable at the shaping stage. |
| 2. Carrageenan (Thermoreversible polysaccharide) | Very solid, cohesive product. Shiny gel appearance. Easily cut and sliceable. pH 3.7 | Weak, brittle, sticky sheet. No real signs of gel formation. Not extrudable at the shaping stage. |
| 3. Gelatine (Thermoreversible protein) | very solid, cohesive, rubbery product. Shiny gel appearance. Easily cut and sliceable. pH 3.8 | Cohesive sheet, rubbery gelled appearance. Not extrudable at the shaping stage. |

It is thus found that the ionic gelling polysaccharide, exemplified by a pectate product, gives rise to a texturally pleasing product when used in the process of this invention. However, in the process described in U.S. Pat. No. 4,041,181 it gives a weak, mushy product since it does not gel controllably under acidic conditions and the gelled matrix is then broken down by subsequent mixing stages. Furthermore, the use of the desired low levels of gelling agent gives a mixture which is far too fluid and does not give a "tough cohesive dough" that can be extruded as described in Example 1 of the U.S. Patent.

Thermoreversible polysaccharides exemplified by carrageenan are also suitable for the process of this invention. However, those that are acid sensitive (e.g. carrageenan) cannot be used in the U.S. Pat. No. 4,041,181 process since they degrade rapidly when subjected to a combination of heat and acidic conditions. It is conceivable that the less sensitive thermoreversible polyasaccharides, e.g. xanthan, would not be degraded by the U.S. Patent process. However, without physically retaining the product shape whilst cooking, something wholly extraneous to the U.S. Patent process, the extruded product would melt into a thin sheet when subjected to heat treatment.

Thermoreversible protein gelling agents are not so acid sensitive and therefore could be expected to withstand the U.S. Pat. No. 4,041,181 process. However, the need to physically retain the shape of the extruded product would again arise, since the thermoreversible property of these agents would inevitably lead to melting during the cooking stage.

What is claimed is:

1. A method of making a meat-in-jelly food product having a moisture content in the range of 65–95% and composed of pieces of edible proteinaceous tissue in a gelled aqueous phase, which product is microbiologically stable without the necessity of hermetic packaging and sterilization; which method consists essentially of
   a. forming a mixture of said proteinaceous tissue, a source of fermentable carbohydrate, an antimycotic, an aqueous solution of an acid-sensitive, thermo-reversible or ionic gelling agent and an inoculum of acid-producing micro-organisms, by steps including:
      i. dissolving said gelling agent to form said aqueous solution at elevated temperature, and
      ii. admixing said inoculum of acid-producing micro-organisms at a temperature at which the viability of said micro-organisms is not impaired,
   b. distributing said inoculum through said mixture prior to gelation of said gelling agent, and thereafter:
   c. cooling said inoculated mixture to effect gelation of said gelling agent and
   d. incubating the micro-organisms to produce acid sufficient to reduce the pH value of the gelled mixture to below 4.5, whereby the meat-in-jelly food product is microbiologically stabilized.

2. A method according to claim 1, wherein said gelling agent comprises citrus peel deesterified to a degree of esterification below 20%.

3. A method according to claim 1, wherein said gelling agent comprises alginate.

4. A method according to claim 1, wherein the quantity of inoculum is in the range 1 to 10 percent by weight of the total composition.

5. A method according to claim 1, wherein said food product comprises 6 to 20% protein and 3 to 12% fat.

6. A method of making a meat-in-jelly food product of the high moisture content type having a moisture content in the range of 65–95% and composed of pieces of edible proteinaceous tissue in a gelled aqueous phase, which product is microbiologically stable without the necessity of hermetic packaging and sterilization, which method consisting essentially of:
   a. forming a mixture of components comprising said proteinaceous tissue, a source of fermentable carbohydrate, an antimycotic and an aqueous solution of an acid-sensitive, thermo-reversible or ionic gelling agent, said solution being formed at elevated temperature, b. introducing an inoculum of acid-producing micro-organisms into said mixture, or with at least one of said components, at a temperature at which the viability of said micro-organisms is not impaired, c. distributing said inoculum through said mixture prior to gelation of said gelling agent, d. causing said gelling agent to at least commence gelation and e. incubating said mixture to cause said micro-organisms to ferment and reduce the pH value of said product to a value below 4.5.

7. In a method of making a meat-in-jelly food product having a moisture content in the range of 65–95% and composed of pieces of edible proteinaceous tissue in a gelled aqueous phase of gelling agent by (a) forming a mixture of components comprising said proteinaceous tissue, a source of fermentable carbohydrate, an antimycotic and an aqueous solution of said gelling agent, said solution being formed at elevated temperature, and (b) thereafter effecting gelation of said gelling agent to produce said meat-in-jelly food product, the improvement consisting essentially of a. using an acid-sensitive, thermoreversible or ionic gelling agent, b. introducing an inoculum of acid-producing micro-organisms prior to gelation under temperature conditions which do not impair the viability of said microorganisms and c. cooling said inoculated mixture to effect gelation of said gelling agent and incubating the micro-organisms to produce acid sufficient to reduce the pH value of the gelled mixture to below 4.5, whereby a high moisture, meat-in-jelly food product is produced which is microbiologically stable without the necessity of hermetic packaging and sterilization.

8. A method of making a meat-in-jelly food product having a moisture content in the range of 65–95% which is composed of pieces of edible proteinaceous tissue in a gelled aqueous phase comprising an acid-sensitive, thermo-reversible or ionic gelling agent, which product is microbiologically stable without the necessity of hermetic packaging and sterilization, said method consisting essentially of:

a. forming a mixture containing said proteinaceous tissue, a source of fermentable carbohydrate, an antimycotic, an aqueous solution of a thermo-reversible or ionic gelling agent and an inoculum of acid-producing micro-organisms, said inoculum having been introduced and distributed prior to gelation of said gelling agent and under temperature conditions which do not impair the viability of said micro-organisms and b. cooling said inoculated mixture to effect gelation of said gelling agent and incubating the microorganisms to produce acid sufficient to reduce the pH value of the gelled mixture to below 4.5.

* * * * *

UNITED STATES PATENT AND TRADEMARK OFFICE
CERTIFICATE OF CORRECTION

PATENT NO. : 4,276,311
DATED : June 30, 1981
INVENTOR(S) : Ian E. Burrows and Peter A. Cheney It is certified that error appears in the above-identified patent and that said Letters Patent are hereby corrected as shown below:

Column 3, line 46, "th" should be--the--.

Column 4, line 25, "from" should be--form--.

Column 4, line 41, after "early" insert--stages--.

Column 8, lines 4-8, should read--total product. The addition of cold ingredients at this stage lowers the temperature of the mixture to 30 - 40°C and hence avoids the necessity of an additional cooling step prior to addition of the inoculum (3%).

Signed and Sealed this

Seventeenth Day of August 1982

[SEAL]

Attest:

Attesting Officer

GERALD J. MOSSINGHOFF
Commissioner of Patents and Trademarks